(12) United States Patent
Bastian et al.

(10) Patent No.: US 11,093,449 B2
(45) Date of Patent: Aug. 17, 2021

(54) DATA PRESENTATION AND MODIFICATION

(71) Applicant: INTERNATIONAL BUSINESS MACHINES CORPORATION, Armonk, NY (US)

(72) Inventors: David Bastian, Dupage, IL (US); Aaron K. Baughman, Silver Spring, MD (US); Nicholas A. McCrory, Sacramento, CA (US); Todd R. Whitman, Bethany, CT (US)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 16/114,702

(22) Filed: Aug. 28, 2018

(65) Prior Publication Data

US 2020/0073961 A1   Mar. 5, 2020

(51) Int. Cl.
*G06F 17/30* (2006.01)
*G06F 3/01* (2006.01)
(Continued)

(52) U.S. Cl.
CPC ............ *G06F 16/168* (2019.01); *G06F 3/014* (2013.01); *G06F 3/016* (2013.01); *G06F 16/26* (2019.01)

(58) Field of Classification Search
CPC ........ G06F 16/168; G06F 16/26; G06F 3/014; G06F 3/016; G10H 2220/311;
(Continued)

(56) References Cited

U.S. PATENT DOCUMENTS

2007/0292047 A1* 12/2007 Jiao .................... G06T 15/04
                                                         382/279
2009/0231272 A1*  9/2009 Rogowitz .......... G06F 3/04815
                                                         345/156
(Continued)

FOREIGN PATENT DOCUMENTS

WO       2015116056 A1     8/2015

OTHER PUBLICATIONS

Bau, Olivier PhD; Teslatouch: Electrovibration for Touch Surfaces; http://www.olivierbau.com/teslatouch.php; retrieved rrom the Internet Aug. 28, 2018; 11 pages.
(Continued)

*Primary Examiner* — Matthew Ell
*Assistant Examiner* — William P Bartlett
(74) *Attorney, Agent, or Firm* — Schmeiser, Olsen & Watts; Nicholas L. Cadmus (57) ABSTRACT

A method and system for improving data storage, presentation, and manipulation is provided. The method includes receiving data from a data source and analyzing the data for data classification attributes. A data set associated with a data classification attribute is selected and a data texture characteristic for association with said data set is received. The data texture characteristic is associated with the data set and a data texture representation associated with the data texture characteristic is presented via a haptic hardware device. A touch-based command associated with the data set is received and a user is enabled to manipulate, transfer, and store the data set.

17 Claims, 7 Drawing Sheets

(51) Int. Cl.
*G06F 16/16* (2019.01)
*G06F 16/26* (2019.01)

(58) Field of Classification Search
CPC ...... G10H 2220/00; G05B 2219/40553; G05B 2219/40619; G05B 2219/35149; G05B 2219/00; G03H 2001/0061; G03H 2001/00

See application file for complete search history.

(56) References Cited

U.S. PATENT DOCUMENTS

| | | | |
|---|---|---|---|
| 2011/0310126 A1* | 12/2011 | Georgiev | G06F 3/03547 345/660 |
| 2014/0071117 A1* | 3/2014 | Schuckle | G06F 3/04815 345/419 |
| 2015/0120777 A1 | 4/2015 | Ramos | |
| 2016/0189396 A1* | 6/2016 | Kwong | G06K 9/4652 345/582 |
| 2016/0217293 A1* | 7/2016 | Farkash | H04L 63/20 |
| 2016/0306825 A9 | 10/2016 | Adelman | |
| 2016/0307345 A1 | 10/2016 | Cardno | |
| 2017/0011443 A1* | 1/2017 | Weerasinghe | G06F 16/951 |
| 2018/0046250 A1* | 2/2018 | Bhaskaran | G06F 3/041 |

OTHER PUBLICATIONS

Bondarev, Egor et al.; CARAT: A Toolkit for Design and Performance Analysis of Component-based Embedded Systems; Proceedings of the Conference on Design, Automation and Test in Europe; Apr. 16-20, 2007; pp. 1024-1029.

* cited by examiner

DATA PRESENTATION AND MODIFICATION

FIELD

The present invention relates generally to a method for storing, presenting, and manipulating data and in particular to a method and associated system for improving data storage technology associated with classifying data for presentation and manipulation via multiple differing touch based texture presentations enabled via usage of a haptic hardware device.

BACKGROUND

Processes for presenting data for user modification typically include an inaccurate process with little flexibility. Coordinating multiple data presentations typically involves an unreliable process. Controlling and directing various data storage means may include a complicated process that may be time consuming and require a large amount of resources. Accordingly, there exists a need in the art to overcome at least some of the deficiencies and limitations described herein above.

SUMMARY

A first aspect of the invention provides a data storage, presentation, and manipulation improvement method comprising: receiving, by a processor of a hardware device, data from a data source; analyzing, by the processor, the data for data classification attributes; selecting, by the processor from the data, a data set associated with a first data classification attribute of the data classification attributes; receiving, by the processor, a first data texture characteristic for association with the data set; associating, by the processor, the first data texture characteristic with the data set; presenting, by the processor to at least one user via a haptic hardware device of the hardware device, a data texture representation associated with the first data texture characteristic; receiving, by the processor from the at least one user via the haptic hardware device, a touch based command associated with the first data set; and enabling, by the processor via the haptic hardware device in response to the receiving the touch based command, the at least one user to manipulate, transfer, and store the first data set.

A second aspect of the invention provides a computer program product, comprising a computer readable hardware storage device storing a computer readable program code, the computer readable program code comprising an algorithm that when executed by a processor of a hardware device implements a data storage, presentation, and manipulation improvement method, the method comprising: receiving, by the processor, data from a data source; analyzing, by the processor, the data for data classification attributes; selecting, by the processor from the data, a data set associated with a first data classification attribute of the data classification attributes; receiving, by the processor, a first data texture characteristic for association with the data set; associating, by the processor, the first data texture characteristic with the data set; presenting, by the processor to at least one user via a haptic hardware device of the hardware device, a data texture representation associated with the first data texture characteristic; receiving, by the processor from the at least one user via the haptic hardware device, a touch based command associated with the first data set; and enabling, by the processor via the haptic hardware device in response to the receiving the touch based command, the at least one user to manipulate, transfer, and store the first data set.

A third aspect of the invention provides a hardware device comprising a processor coupled to a computer-readable memory unit, the memory unit comprising instructions that when executed by the computer processor implements a data storage, presentation, and manipulation improvement method comprising: receiving, by the processor, data from a data source; analyzing, by the processor, the data for data classification attributes; selecting, by the processor from the data, a data set associated with a first data classification attribute of the data classification attributes; receiving, by the processor, a first data texture characteristic for association with the data set; associating, by the processor, the first data texture characteristic with the data set; presenting, by the processor to at least one user via a haptic hardware device of the hardware device, a data texture representation associated with the first data texture characteristic; receiving, by the processor from the at least one user via the haptic hardware device, a touch based command associated with the first data set; and enabling, by the processor via the haptic hardware device in response to the receiving the touch based command, the at least one user to manipulate, transfer, and store the first data set.

The present invention advantageously provides a simple method and associated system capable of accurately presenting data for user modification.

DETAILED DESCRIPTION

Figure 1:
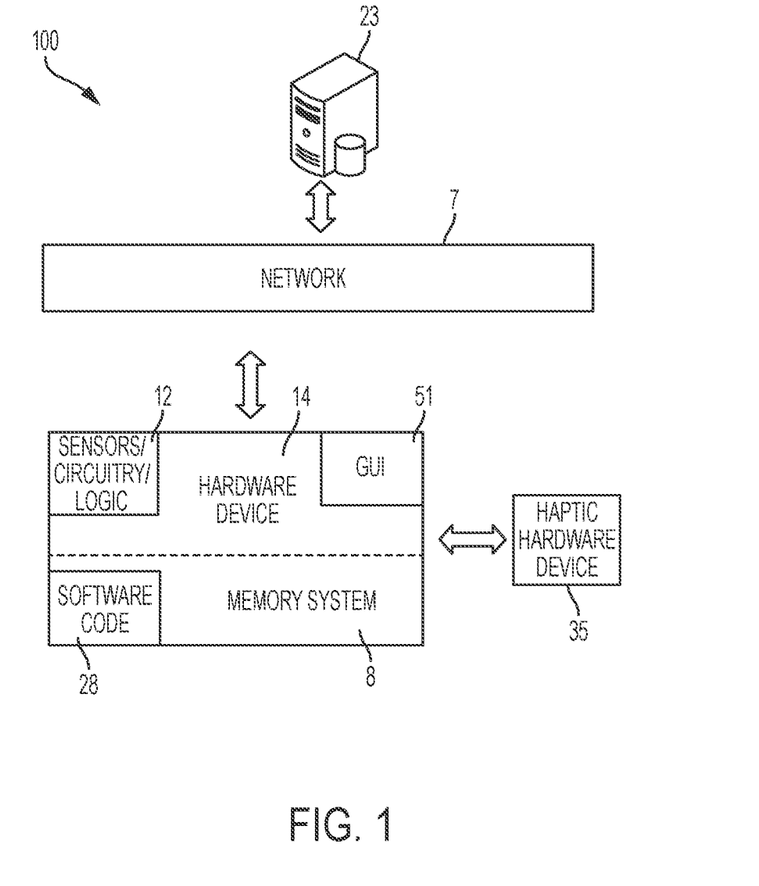
FIG. 1 illustrates a system for improving data storage technology associated with classifying data for presentation and manipulation via multiple differing touch-based texture presentations enabled via usage of a haptic hardware device, in accordance with embodiments of the present invention.

FIG. 1 illustrates a system 100 for improving data storage technology associated with classifying data for presentation and manipulation via multiple differing touch-based texture presentations enabled via usage of a haptic hardware device 35, in accordance with embodiments of the present invention. The improvement in data storage technology allows a user to use haptic touch-based functionality for presenting and manipulating data securely via touch instead of visually. System 100 is enabled to automatically allow a user to represent data structures and an associated density via a sense of touch (e.g., via haptic touch technology) generated by haptic hardware device 35 thereby enabling the user to physically touch and feel contours of the data so that complexities of the data are represented via touch based functionality thereby allowing the user to gain a spatial awareness of data by distances between texture attributes. Haptic touch technology is defined herein as a mechanical stimulation process (implemented via a haptic device) for recreating a sense of touch by applying forces, vibrations, or motions to a user. The mechanical stimulation process may be used to assist in the creation of virtual objects in a computer simulation to control the virtual objects and enhance a remote process for controlling of machines and devices (e.g., tele-robotics). Haptic devices may incorporate tactile sensors that measure forces exerted by the user on an interface.

System 100 generates stealth textures associated with real contours of private data such that the data is displayed via a texture (instead of visually) thereby allowing a user to use a sense of touch to understand the data. Data visualization techniques may be combined with stealth texture presentations for driving data visualization such that a user may use a sense of touch with respect to a texture pane to discover undetectable hidden (stealth) anomalies in the data. The texture presented data may be manipulated via usage of a haptic hardware device 35 for locating data in a stealth manner for security purposes. Therefore, large volumes of data may be sifted by using a physical tactile discovery and manipulation process for physically manipulating discovered areas within the data.

System 100 enables a process that includes:
1. Creating haptic touch-based textures (for presentation via a GUI) based on data diversity.
2. Producing textural depth (for the touch-based textures) based on data volume.
3. Producing stealth texture structures to convey sensitive data.
4. Providing enhanced opportunities in the fields of data science and data mining for sighted and vision impaired users.
5. Generating a spatial relationship between texture panes according to geographical, disk, sector, etc. levels.
6. Projecting texture panes onto touch screens, virtual reality devices, or augmented reality devices.
7. Applying stealth textures to convey sensitive data and hiding texture panes comprising sensitive data such that the data is presented as an average of neighboring panes.

System 100 of FIG. 1 includes a server hardware device 23 connected through a network 7 to a hardware device 14 (connected to or integrated with a haptic hardware device 35). Hardware device 14 comprises sensors/circuitry/logic 12, a graphical user interface (GUI) 51, and a (specialized) memory system 8. Memory system 8 comprises software code 28. Memory system 8 may include a single memory system. Alternatively, memory system 8 may include a plurality of memory systems. Server hardware device 23 and hardware device 14 each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server hardware device 23 and hardware device 14 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-7. The specialized discrete non-generic analog, digital, and logic based circuitry (e.g., sensors/circuitry/logic 12, etc.) may include proprietary specially designed components (e.g., a specialized integrated circuit, such as for example an Application Specific Integrated Circuit (ASIC) designed for only implementing an automated process for improving data storage technology associated with classifying data for presentation and manipulation via multiple differing touch based texture presentations enabled via usage of a haptic hardware device 35. Sensors/circuitry/logic 12 may include any type of internal or external sensors including, inter alia, GPS sensors, social network code-based sensors, voltage sensors, network traffic sensors, video retrieval devices, heartrate sensors, moisture sensors, blood pressure sensors, temperature sensors, pressure sensors, etc. Haptic hardware device may include any type of haptic hardware including a haptic data glove with display such as goggles, a rumble box, a joystick, a touch screen, hologram goggles, a virtual reality device, an augmented reality device, etc. Network 7 may include any type of network including, inter alia, a local area network, (LAN), a wide area network (WAN), the Internet, a wireless network, etc.

Figure 2:
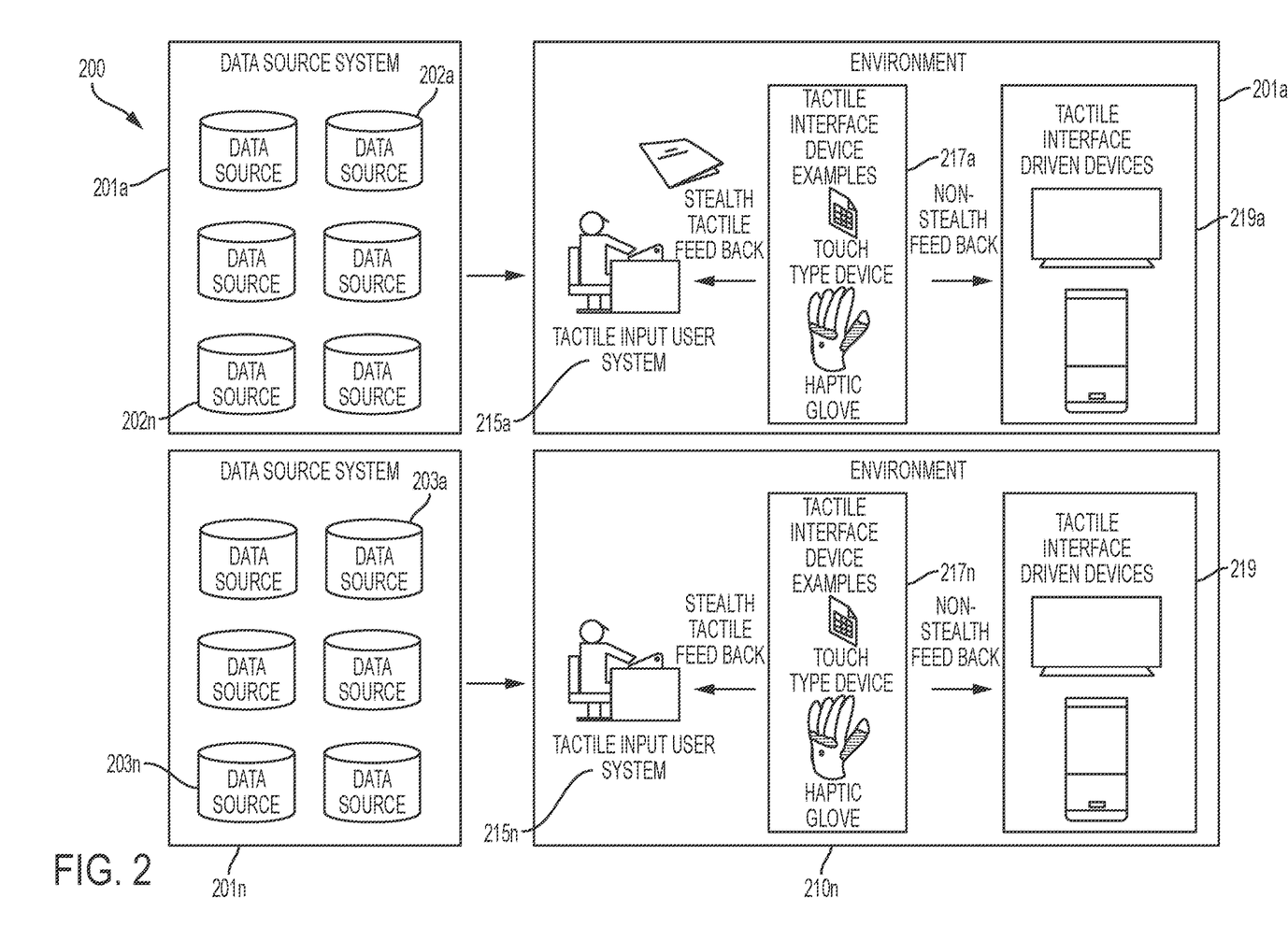
FIG. 2 illustrates an implementation example enabling a system for improving data storage technology associated haptic based data presentation and manipulation, in accordance with embodiments of the present invention.

System 100 enables the following process for virtually manipulating and storing data based on haptic interface commands:

The process is initiated when data is represented in datasets and data attributes are selected from a predetermined set of data attributes for each of the datasets. The predetermined set of data attributes may include includes a perceived: density of data, a velocity of movement of the data, a volume of the data, a pliability of the data, a heat intensity of the data. physical dimensions of the data, etc. Texture characteristics are selected from a predetermined set of texture characteristics for each of the datasets. Each of the texture characteristics are assigned to correspond with each of the selected data attributes of the datasets. The selected texture characteristics and corresponding selected data attributes may correlate with stealth (e.g., private, secure, sensitive, etc.) information concerning the data in each of the datasets. The stealth information may include trends of the data, averages of the data, averages of adjoining data sets, growth of the data, geographical affiliations of the data, financial aspects of the data, predictions of future data based on past performance, privacy of the data, relevance of the data, accuracy of the data, volatility of the data, etc. The predetermined set of texture characteristics may include includes perceptions of: a solidity of the data, a fluidity of the data, a pliability of the data, a thickness of the data, a warmth of the data, physical dimensions of the data, smoothness or roughness of a surface of the data, etc. A user (using a tactile (haptic) interface device connected to or integrated with a user device) provides recognition of the selected texture characteristics of each of the datasets. Additionally, the user (using a tactile (haptic) interface device) provides recognition of the data attributes for each of the datasets in response to the recognition by the user of the texture characteristics. Likewise, the data in each of the datasets is differently represented in accordance with the selected texture characteristics and a corresponding selected data attribute FIG. 2 illustrates an implementation example enabling a system 200 for improving data storage technology associated haptic based data presentation and manipulation, in accordance with embodiments of the present invention. System 200 comprises data source systems 201a . . . 201n each connected to an associated data manipulation environment 210a . . . 210n. Data source system 201a comprises databases 201a . . . 202n comprising data sources. Data source system 201n comprises databases 203a . . . 203n comprising data sources. Data manipulation environment 210a comprises a tactile user input system 215a receiving stealth tactile feedback from tactile interface devices 217a (e.g., a haptic glove) providing non-stealth feedback to tactile interface driven devices 219a such as a monitor or an Internet of Things (JOT) device. Data manipulation environment 210n comprises a tactile user input system 215n receiving stealth tactile feedback from tactile interface devices 217n (e.g., a haptic glove) providing non-stealth feedback to tactile interface driven devices 219n such as a monitor or an Internet of Things (IOT) device. System 200 enables a process that includes collecting and distilling data for tactile presentation. In response, a user uses a sense of touch to interrogate the data presented via usage of a tactile presentation device (e.g., a touch device, a haptic glove, etc.) for enabling a depth of data tactile feel for the user. The tactile presentation device may be used to communicate sensitive data (that should not be displayed such as, inter alia, social security or tax information) in a stealth manner. The tactile presentation device may be used in combination with a visual or audio presentation device thereby enabling multiple sensory presentation of data using tactile manipulation to direct and manipulate the presentation or editing of the data.

Figure 3:
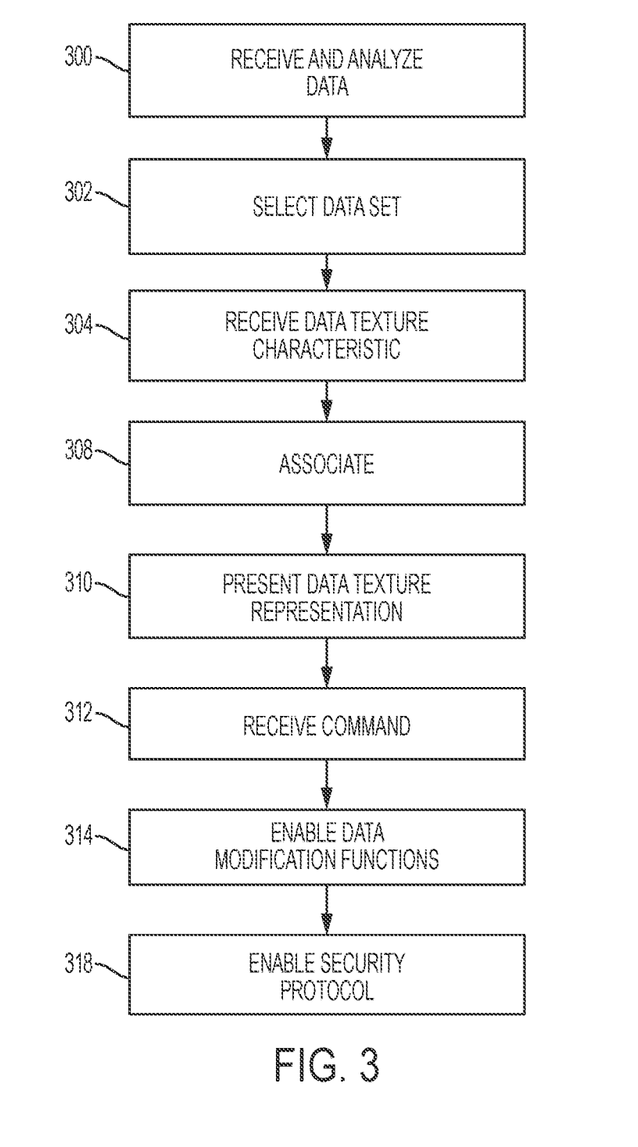
FIG. 3 illustrates an algorithm detailing a process flow enabled by the system of FIG. 1 for improving data storage technology associated with classifying data for presentation and manipulation via multiple differing touch-based texture presentations enabled via usage of a haptic hardware device, in accordance with embodiments of the present invention.

FIG. 3 illustrates an algorithm detailing a process flow enabled by system 100 of FIG. 1 for improving data storage technology associated with classifying data for presentation and manipulation via multiple differing touch-based texture presentations enabled via usage of a haptic hardware device, in accordance with embodiments of the present invention. Each of the steps in the algorithm of FIG. 3 may be enabled and executed in any order by a computer processor(s) executing computer code. Additionally, each of the steps in the algorithm of FIG. 3 may be enabled and executed in combination by server hardware device 23 and hardware device 14 of FIG. 1. In step 300, data is received from a data source. The data is analyzed for data classification attributes. In step 302, a data set associated with a first data classification attribute is selected from the data. The data classification attribute may include an attribute classifying the data set as sensitive privacy data. Data of the data set may be represented as a series of tactile representations for texture-based touch presentations for manipulation by the user.

In step 304, a data texture characteristic for association with the data set is received. The data texture characteristic may be generated via execution of x, y, z directional code for directionally representing a specified data texture for virtually interpreting the data set. In step 308, the data texture characteristic is associated with the data set. The association process may include:
1. Executing a three-dimensional texture convolution filter with respect to the data texture characteristic.
2. Executing specialized rigor mortis code with respect to the data texture characteristic and the data classification attributes.
3. Executing Gabor filter analysis code with respect to the data texture characteristic such that a data texture representation is generated.

In step 310, the data texture representation associated with the data texture characteristic is presented to a user via a haptic hardware device. The haptic hardware device may include, inter alia, a touch screen device, a haptic glove device, a virtual eyewear device, a hologram generation eyewear device, a virtual reality device, an augmented reality device, etc.

In step 312, a touch-based command associated with the data set is received from the user via the haptic hardware device. In step 314, the user is enabled (via the haptic hardware device in response to receiving the touch-based command) to manipulate, transfer, and store the data set. In step 318, a security protocol is enabled. The security protocol for a single user may include personalizing the data texture characteristic for the single user such that only the user is able to tactically recognize the data texture characteristic for manipulating, transferring, and storing the data set. Alternatively, the security protocol for multiple users may include personalizing the data texture characteristic for the multiple users such that only the multiple users are able to tactically recognize the data texture characteristic for manipulating, transferring, and storing the data set.

Figure 4:
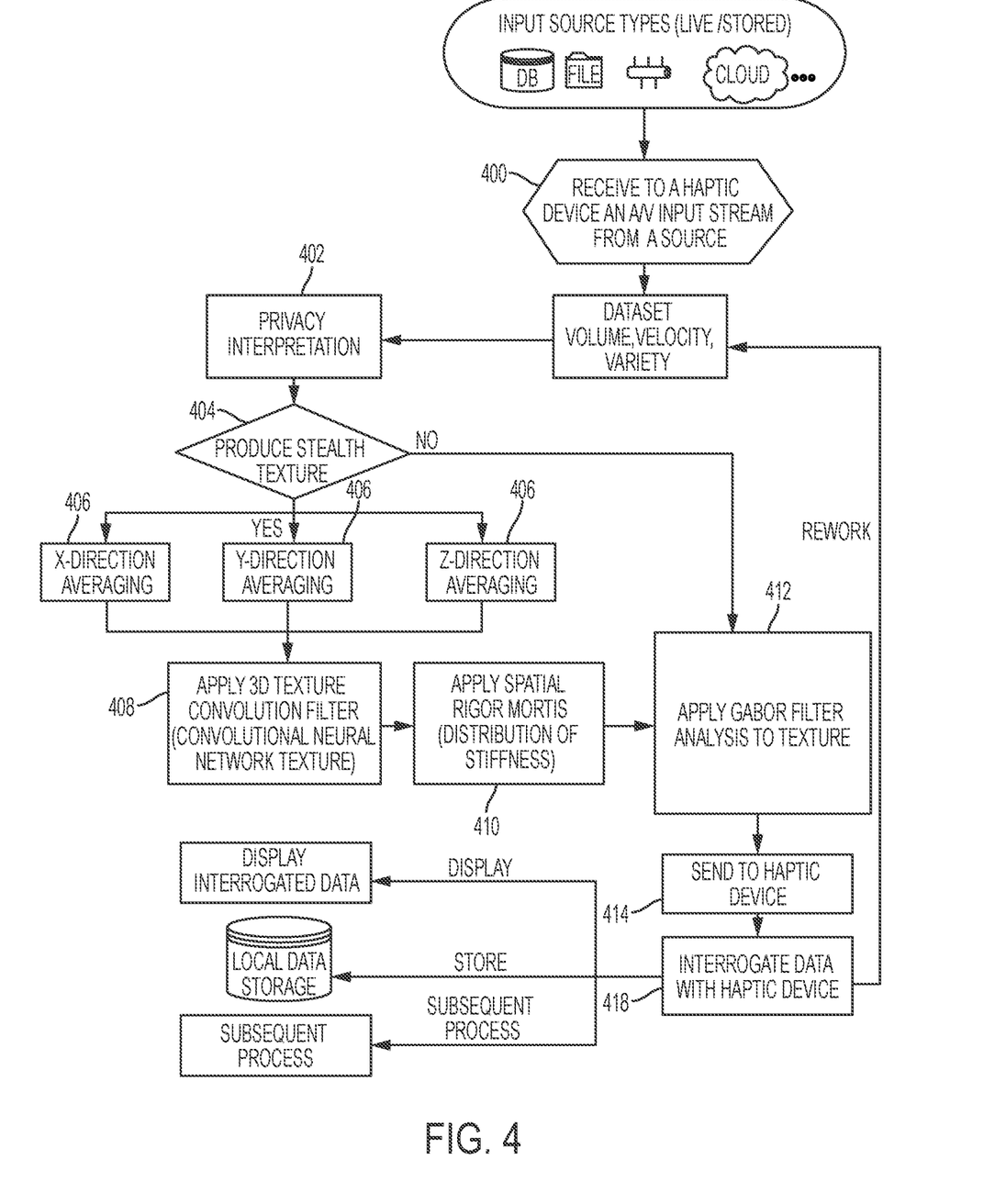
FIG. 4 illustrates an algorithm detailing an implementation example based process flow enabled by the system of FIG. 1 for improving data interrogation and storage, in accordance with embodiments of the present invention.

FIG. 4 illustrates an algorithm detailing an implementation-based example process flow enabled by system 100 of FIG. 1 for improving data interrogation and storage, in accordance with embodiments of the present invention. Each of the steps in the algorithm of FIG. 4 may be enabled and executed in any order by a computer processor(s) executing computer code. Additionally, each of the steps in the algorithm of FIG. 4 may be enabled and executed in combination by server hardware device 23 and hardware device 14 of FIG. 1. In step 400, data (for haptic interrogation) is received, collected, and distilled for tactile presentation. In step 402, the data is analyzed for privacy interpretation and classification. If in step 404, data is not classified as requiring a stealth texture application, then step 412 is executed as described, infra. If in step 404, data is classified as requiring a stealth texture application, then in step 406, the data texture representation is manipulated using X-Y-Z averaging code. In step 408, the data is passed through a convolutional neural network three-dimensional digital texture filter to generate a data texture structure. In step 410, the data texture structure is modified with respect to spatial rigor mortis code according to its classification. In step 412, Gabor filter application code is applied to the modified data texture structure. In step 414, the modified data texture structure is transmitted to a haptic device such that the user uses a sense of touch to interrogate the data presented via a tactile presentation device (e.g., a haptic glove) for depth of data tactile feel. The tactile presentation device may be used to communicate sensitive data that should not be displayed in a non-stealth manner. Additionally, haptic data may be re-analyzed after an initial interrogation process has terminated to examine a subset of original data, stored, displayed, or transmitted to a subsequent process.

Figure 5:
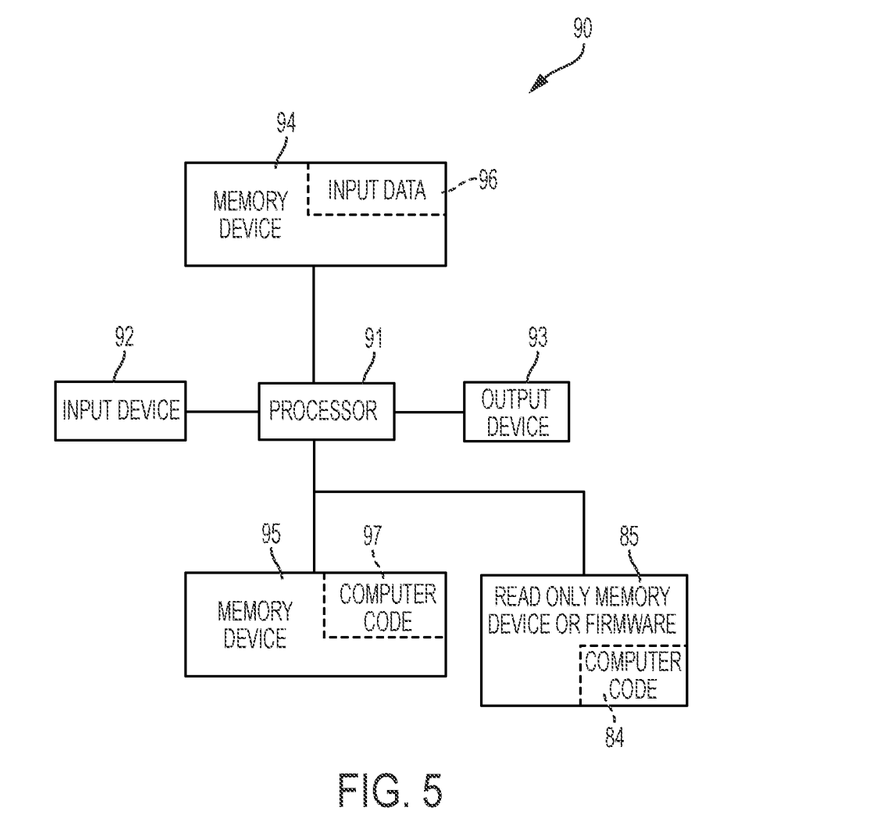
FIG. 5 illustrates a computer system used by the system of FIG. 1 for improving data storage technology associated with classifying data for presentation and manipulation via multiple differing touch-based texture presentations enabled via usage of a haptic hardware device, in accordance with embodiments of the present invention.

FIG. 5 illustrates a computer system 90 (e.g., server hardware device 23 and hardware device 14 of FIG. 1 of FIG. 1) used by or comprised by the system of FIG. 1 for improving data storage technology associated with classifying data for presentation and manipulation via multiple differing touch based texture presentations enabled via usage of a haptic hardware device, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 3 and 4) for improving data storage technology associated with classifying data for presentation and manipulation via multiple differing touch based texture presentations enabled via usage of a haptic hardware device. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 85) may include algorithms (e.g., the algorithms of FIGS. 3 and 4) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve data storage technology associated with classifying data for presentation and manipulation via multiple differing touch-based texture presentations enabled via usage of a haptic hardware device. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving data storage technology associated with classifying data for presentation and manipulation via multiple differing touch based texture presentations enabled via usage of a haptic hardware device. In another embodiment, the invention provides a business method that performs the process steps of the invention on a subscription, advertising, and/or fee basis. That is, a service supplier, such as a Solution Integrator, could offer to enable a process for improving data storage technology associated with classifying data for presentation and manipulation via multiple differing touch-based texture presentations enabled via usage of a haptic hardware device. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

Figure 6:
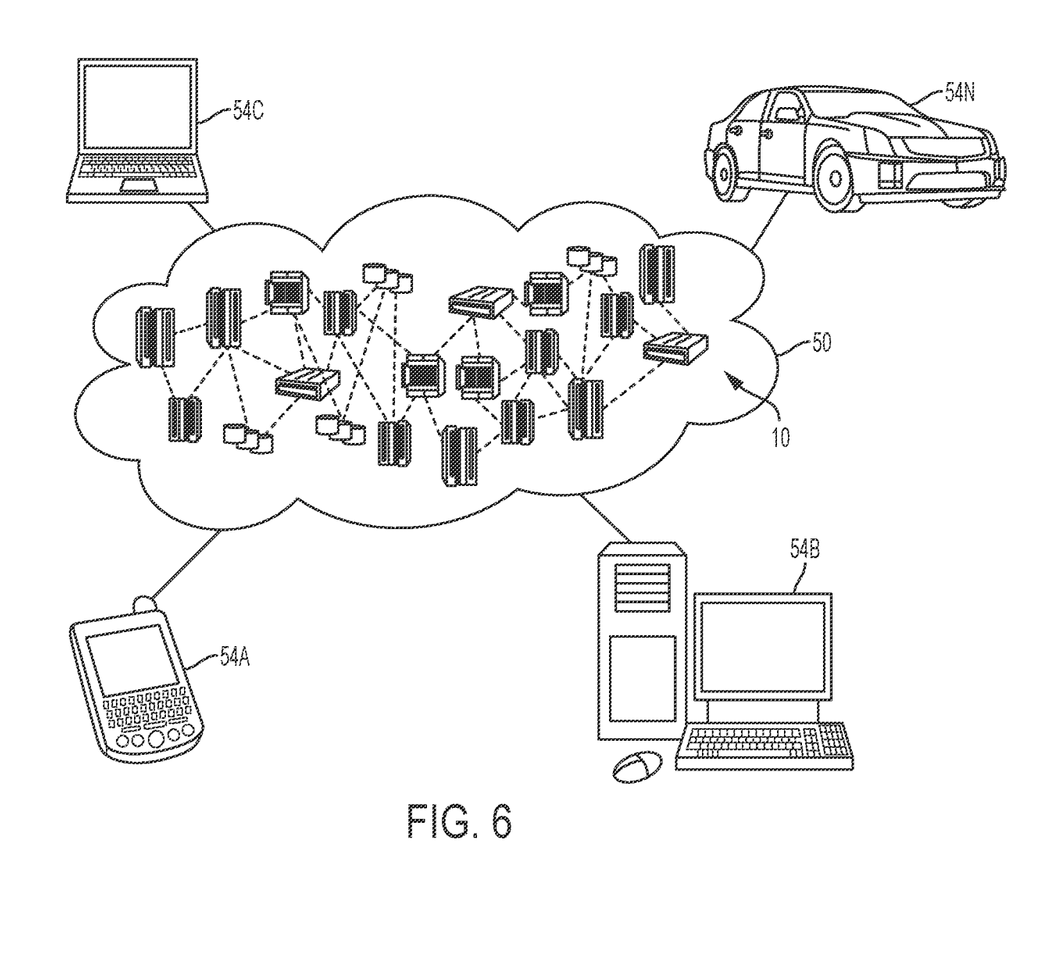
FIG. 6 illustrates a cloud computing environment, in accordance with embodiments of the present invention.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
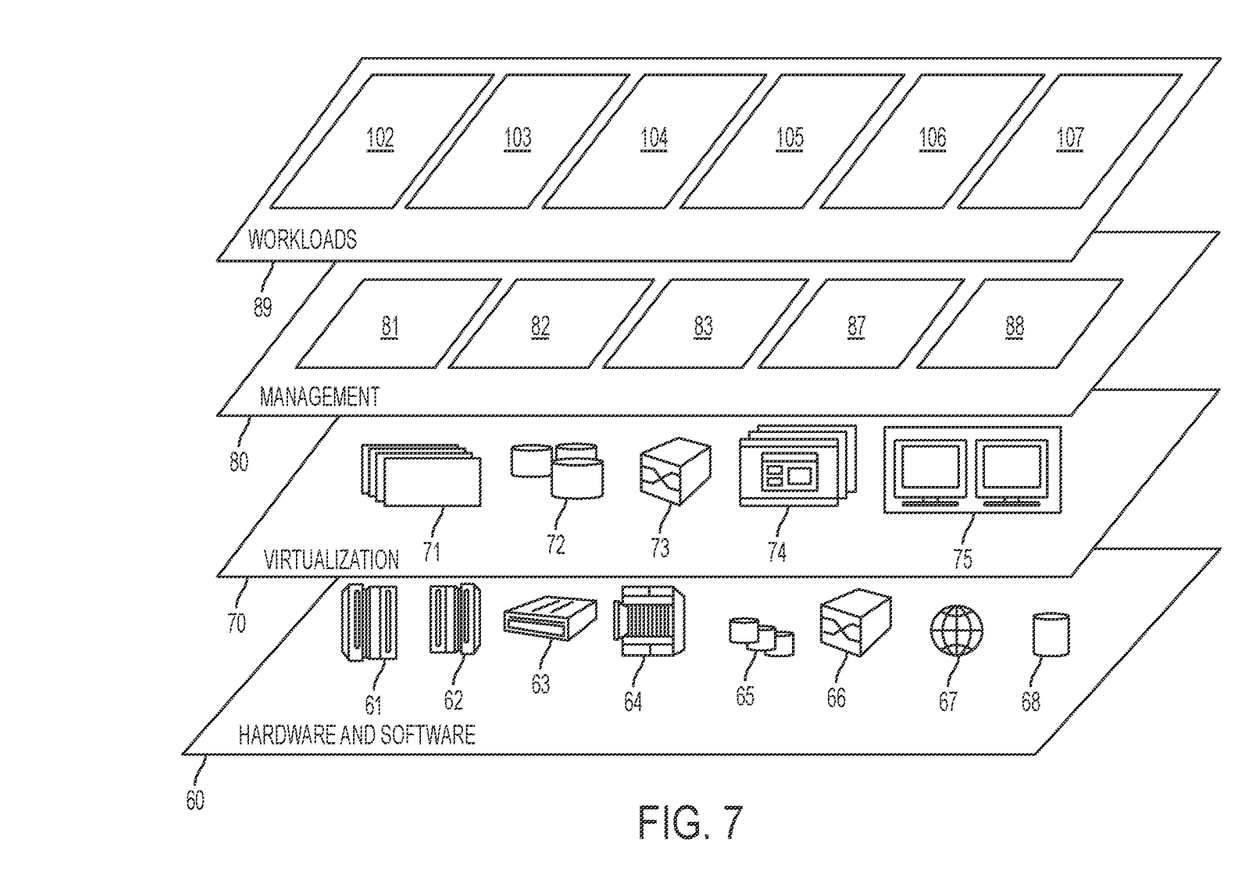
FIG. 7 illustrates a set of functional abstraction layers provided by cloud computing environment, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 102; software development and lifecycle management 103; virtual classroom education delivery 104; data analytics processing 105; transaction processing 106; and for improving data storage technology associated with classifying data for presentation and manipulation via multiple differing touch based texture presentations enabled via usage of a haptic hardware device 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A data storage, presentation, and manipulation improvement method comprising:

receiving, by a processor of a hardware device, data from a data source;

analyzing, by said processor of the hardware device, said data for data classification attributes;

selecting, by said processor of the hardware device from said data, a data set associated with a first data classification attribute of said data classification attributes, wherein said first data classification attribute represents a velocity of movement and a heat intensity of said data;

receiving, by said processor of the hardware device, a first data texture characteristic for association with said data set;

associating, by said processor of the hardware device, said first data texture characteristic with said data set, wherein said associating said first data texture characteristic with said data set comprises:

first executing a first three-dimensional texture convolution filter with respect to said data texture characteristic;

second executing specialized code with respect to said data texture characteristic and said data classification attributes; and third executing Gabor filter analysis code with respect to said data texture characteristic, wherein said first executing, said second executing, and said third executing result in generation of said data texture representation;

presenting, by said processor of the hardware device to at least one user via a haptic hardware device of said hardware device, a data texture representation associated with said first data texture characteristic, wherein data representations of said first data set are represented as a series of tactile representations, enabled via tactile sensors, for textural depth-based touch presentations based on data volume for manipulation by said at least one user, wherein said series of tactile representations recreate a sense of touch by applying forces, vibrations, and motions representing said data to said at least one user, and wherein a first data representation of said data representations comprises a stealth texture structure representing sensitive data of said at least one user;

generating and presenting, by said processor to said at least one user via said haptic hardware device, an object representing a spatial relationship between texture panes with respect to a disk sector;

applying, by said processor via said haptic hardware device, said stealth texture such that said sensitive data is represented as hidden texture panes;

receiving, by said processor of the hardware device from said at least one user via said haptic hardware device of said hardware device, a touch-based command associated with said first data set;

enabling, by said processor of the hardware device via said haptic hardware device of said hardware device in response to said receiving said touch-based command, said at least one user to manipulate, transfer, and store said first data set; and further enabling, by said processor via said haptic hardware device of said hardware device in response to said receiving said touch-based command, a remote process comprising controlling machines and devices comprising tele-robotic devices.

2. The method of claim 1, wherein said first data texture characteristic is generated via execution of x, y, z directional code for directionally representing a specified data texture for virtually interpreting said data set.

3. The method of claim 1, wherein said at least one user comprises a single user, and wherein said method further comprises:

personalizing, by said processor of the hardware device, said first data texture characteristic for said single user such that only said single user is associated with said first data texture characteristic for manipulating, transferring, and storing said first data set.

4. The method of claim 1, wherein said at least one user comprises a group of users, and wherein said method further comprises;

personalizing, by said processor of the hardware device, said first data texture characteristic for said group of users such that only said group of users is associated with said first data texture characteristic for manipulating, transferring, and storing said first data set.

5. The method of claim 1, wherein said first data classification attribute comprises an attribute classifying said data set as sensitive privacy data.

6. The method of claim 1, wherein said haptic hardware device of said hardware device comprises a device selected from a group consisting of a touch screen device, a haptic glove device, a virtual eyewear device, a hologram generation eyewear device, a virtual reality device, and an augmented reality device.

7. The method of claim 1, data of said first data set is represented as a series of tactile representations for texture-based touch presentations for manipulation by said at least one user.

8. The method of claim 1, further comprising:

providing at least one support service for at least one of creating, integrating, hosting, maintaining, and deploying computer-readable code in the hardware device, said computer-readable code being executed by the processor of the hardware device to implement: said receiving said data, said analyzing, said selecting, said receiving said first data texture characteristic, associating, said presenting, said receiving said touch based command, and said enabling.

9. A computer program product, comprising a computer readable hardware storage device storing a computer readable program code, said computer readable program code comprising an algorithm that when executed by a processor of a hardware device implements a data storage, presentation, and manipulation improvement method, said method comprising:

receiving, by said processor of the hardware device, data from a data source;

analyzing, by said processor of the hardware device, said data for data classification attributes;

selecting, by said processor of the hardware device from said data, a data set associated with a first data classification attribute of said data classification attributes, wherein said first data classification attribute represents a velocity of movement and a heat intensity of said data;

receiving, by said processor of the hardware device, a first data texture characteristic for association with said data set;

associating, by said processor of the hardware device, said first data texture characteristic with said data set, wherein said associating said first data texture characteristic with said data set comprises:

first executing a first three-dimensional texture convolution filter with respect to said data texture characteristic;

second executing specialized code with respect to said data texture characteristic and said data classification attributes; and third executing Gabor filter analysis code with respect to said data texture characteristic, wherein said first executing, said second executing, and said third executing result in generation of said data texture representation;

presenting, by said processor of the hardware device to at least one user via a haptic hardware device of said hardware device, a data texture representation associated with said first data texture characteristic, wherein data representations of said first data set are represented as a series of tactile representations, enabled via tactile sensors, for textural depth-based touch presentations based on data volume for manipulation by said at least one user, wherein said series of tactile representations recreate a sense of touch by applying forces, vibrations, and motions representing said data to said at least one user, and wherein a first data representation of said data representations comprises a stealth texture structure representing sensitive data of said at least one user;

generating and presenting, by said processor to said at least one user via said haptic hardware device, an object representing a spatial relationship between texture panes with respect to a disk sector;

applying, by said processor via said haptic hardware device, said stealth texture such that said sensitive data is represented as hidden texture panes;

receiving, by said processor of the hardware device from said at least one user via said haptic hardware device of said hardware device, a touch-based command associated with said first data set;

enabling, by said processor of the hardware device via said haptic hardware device of said hardware device in response to said receiving said touch-based command, said at least one user to manipulate, transfer, and store said first data set; and further enabling, by said processor via said haptic hardware device of said hardware device in response to said receiving said touch-based command, a remote process comprising controlling machines and devices comprising tele-robotic devices.

10. The computer program product of claim 9, wherein said first data texture characteristic is generated via execution of x, y, z directional code for directionally representing a specified data texture for virtually interpreting said data set.

11. The computer program product of claim 9, wherein said at least one user comprises a single user, and wherein said method further comprises:

personalizing, by said processor of the hardware device, said first data texture characteristic for said single user such that only said single user is associated with said first data texture characteristic for manipulating, transferring, and storing said first data set.

12. The computer program product of claim 9, wherein said at least one user comprises a group of users, and wherein said method further comprises;

personalizing, by said processor of the hardware device, said first data texture characteristic for said group of users such that only said group of users is associated with said first data texture characteristic for manipulating, transferring, and storing said first data set.

13. The computer program product of claim 9, wherein said first data classification attribute comprises an attribute classifying said data set as sensitive privacy data.

14. The computer program product of claim 9, wherein said haptic hardware device of said hardware device comprises a device selected from a group consisting of a touch screen device, a haptic glove device, a virtual eyewear device, a hologram generation eyewear device, a virtual reality device, and an augmented reality device.

15. The computer program product of claim 9, data of said first data set is represented as a series of tactile representations for texture-based touch presentations for manipulation by said at least one user.

16. A hardware device comprising a processor coupled to a computer-readable memory unit, said memory unit comprising instructions that when executed by the processor implements a data storage, presentation, and manipulation improvement method comprising:

receiving, by said processor of the hardware device, data from a data source;

analyzing, by said processor of the hardware device, said data for data classification attributes;

selecting, by said processor of the hardware device from said data, a data set associated with a first data classification attribute of said data classification attributes, wherein said first data classification attribute represents a velocity of movement and a heat intensity of said data;

receiving, by said processor of the hardware device, a first data texture characteristic for association with said data set;

associating, by said processor of the hardware device, said first data texture characteristic with said data set, wherein said associating said first data texture characteristic with said data set comprises:

first executing a first three-dimensional texture convolution filter with respect to said data texture characteristic;

second executing specialized code with respect to said data texture characteristic and said data classification attributes; and third executing Gabor filter analysis code with respect to said data texture characteristic, wherein said first executing, said second executing, and said third executing result in generation of said data texture representation;

presenting, by said processor of the hardware device to at least one user via a haptic hardware device of said hardware device, a data texture representation associated with said first data texture characteristic, wherein data representations of said first data set are represented as a series of tactile representations, enabled via tactile sensors, for textural depth-based touch presentations based on data volume for manipulation by said at least one user, wherein said series of tactile representations recreate a sense of touch by applying forces, vibrations, and motions representing said data to said at least one user, and wherein a first data representation of said data representations comprises a stealth texture structure representing sensitive data of said at least one user;

generating and presenting, by said processor to said at least one user via said haptic hardware device, an object representing a spatial relationship between texture panes with respect to a disk sector;

applying, by said processor via said haptic hardware device, said stealth texture such that said sensitive data is represented as hidden texture panes;

receiving, by said processor of the hardware device from said at least one user via said haptic hardware device of said hardware device, a touch-based command associated with said first data set;

enabling, by said processor of the hardware device via said haptic hardware device of said hardware device in response to said receiving said touch-based command, said at least one user to manipulate, transfer, and store said first data set; and further enabling, by said processor via said haptic hardware device of said hardware device in response to said receiving said touch-based command, a remote process comprising controlling machines and devices comprising tele-robotic devices.

17. The hardware device of claim 16, wherein said first data texture characteristic is generated via execution of x, y, z directional code for directionally representing a specified data texture for virtually interpreting said data set.

* * * * *